United States Patent
Ono et al.

(10) Patent No.: US 8,746,949 B2
(45) Date of Patent: Jun. 10, 2014

(54) LIGHT EMITTER

(75) Inventors: Youji Ono, Niigata (JP); Tatsuya Ueda, Niigata (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 451 days.

(21) Appl. No.: 13/257,656

(22) PCT Filed: Mar. 24, 2010

(86) PCT No.: PCT/JP2010/002047
§ 371 (c)(1),
(2), (4) Date: Sep. 20, 2011

(87) PCT Pub. No.: WO2010/113422
PCT Pub. Date: Oct. 7, 2010

(65) Prior Publication Data
US 2012/0008338 A1      Jan. 12, 2012

(30) Foreign Application Priority Data

Mar. 31, 2009  (JP) ................................. 2009-084118
Jul. 6, 2009   (JP) ................................. 2009-159444

(51) Int. Cl.
*F21V 7/04* (2006.01)

(52) U.S. Cl.
USPC .......................................... 362/615; 362/628

(58) Field of Classification Search
USPC ................................................ 362/615, 628
See application file for complete search history.

(56) References Cited

U.S. PATENT DOCUMENTS

2008/0268235 A1* 10/2008 Kimura et al. ................ 428/327
2012/0051696 A2*  3/2012 Schmidt et al. .............. 264/1.24

FOREIGN PATENT DOCUMENTS

| JP | 57 128383  | 8/1982  |
| JP | 10 31114   | 2/1998  |
| JP | 3162398    | 2/2001  |
| JP | 2006 286217| 10/2006 |
| WO | 2007 029679| 3/2007  |

OTHER PUBLICATIONS

International Search Report issued Jun. 15, 2010 in PCT/JP10/002047 filed Mar. 24, 2010.

* cited by examiner

*Primary Examiner* — Y My Quach Lee
(74) *Attorney, Agent, or Firm* — Oblon, Spivak, McClelland, Maier & Neustadt, L.L.P.

(57) ABSTRACT

Provided is a surface light emitter that supplies light using a light guide method, and ensures transparency by lowering a haze value in a thickness direction at the time when a light source is turned off, and enables highly efficient light emission by using plate-surface transversal radiant emitted light at the time when the light source is on. A surface light emitter (2) including light diffusing particles guides light in a length direction of the light guide while scattering the light in the thickness direction of the light guide while scattering the light in the thickness direction of the light guide, and a calculated value ($m^{-1}/\%$) obtained by dividing a luminance attenuation coefficient E ($m^{-1}$) by a haze value (%) per 5 (mm) thickness of the light guide is greater than or equal to 0.55 ($m^{-1}/\%$) and less than or equal to 10.0 ($m^{-1}/\%$).

20 Claims, 7 Drawing Sheets

LIGHT EMITTER

TECHNICAL FIELD

The present invention relates to a light emitter supplied with light using a light guide method.

BACKGROUND ART

Conventionally, as for a surface light emitter, a usage as a display has been mainstream as can be seen in a backlight light source device of a liquid crystal display device.

In recent years, a movement of using this surface light emitter as a gobo for building material and amusement etc. has been increasing. In such a case, the gobo is required to act as a transparent plate at the time when a light source is turned off, and to act as a gobo by plate-surface transversal radiant emitted light at the time when the light source is on, so as to act to block view in the back.

As for past general liquid crystal displays, in the case of a transmissive liquid crystal, a non-transparent backlight device is required and in the case of a reflective liquid crystal, a reflective plate is practically required. Therefore, in either of the case, it has been non-transparent as the whole display device.

In the surface light emitter, a configuration, in which a scattering function is incorporated by convexo-concave, dot printing, or the like to the light guide surface as can be seen in the backlight light source device of the liquid crystal display device (Patent literature 1), or a configuration, in which light diffusing particles with a small refractive index difference $\Delta n$ between a refractive index of a substrate and the refractive index of the light diffusion particles are included inside (Patent literature 2), are known. In these configurations, the light guide may be opaque or a haze value in the thickness direction of the light guide is large when the light source is turned off. Therefore, although it is possible to perform shading effect when the light source is turned off, it has been difficult to act as a transparent plate at the time of extinction.

CITATION LIST

Patent Literature

Patent literature 1: Japanese Unexamined Patent Application Publication No. 57-128383
Patent literature 2: Japanese Patent No. 3162398

SUMMARY OF INVENTION

Technical Problem

The present invention is made in light of such circumstances, and aims to provide a light emitter that ensures transparency by reducing a haze value in the thickness or diameter direction (direction orthogonal to a light guiding direction) at the time when a light source is turned off, and enables highly efficient light emission by using plate-surface transversal radiant emitted light at the time when the light source is turned on.

Solution to Problem

In order to solve the above problem an aspect of a light emitter according to the present invention is a light emitter using a transparent substrate including light diffusing particles that guides light in a length direction of the transparent substrate while scattering the light in a thickness direction of the transparent substrate, and a calculated value ($m^{-1}$/%) obtained by dividing a luminance attenuation coefficient E ($m^{-1}$) by a haze value (%) per 5 (mm) thickness of the transparent substrate is greater than or equal to 0.55 ($m^{-1}$/%) and less than or equal to 10.0 ($m^{-1}$%).

This light emitter works as a transparent plate by using a transparent substrate of a low haze value which satisfies the calculated value at the time of extinction, and realizes highly efficient light emission by light diffusing particles included in the transparent substrate at the time of lighting. Then a display device working as a backlight or a gobo can be realized.

Additionally, in one aspect of a light emitter according to the present invention, the transparent substrate preferably includes at least light diffusing particles with an absolute value of a refractive index difference $\Delta n$ between a refractive index of the substrate and a refractive index of the light diffusing particles is greater than or equal to 0.3 and less than or equal to 3, and concentration of the light diffusing particles is greater than or equal to 0.0001 weight % and 0.01 weight %, and moreover, the light diffusing particles are composed of particles having a weight average diameter in which a product of the absolute value of the refractive index difference $\Delta n$ and a weight average diameter d (mm) of the particles is greater than or equal to 0.0001 (mm).

Moreover, the transparent substrate is preferably a light guide with a haze value of less than or equal to 30% in the thickness direction. Furthermore, the transparent substrate is preferably configured in a way that the number of particle layers $S_1$ in the thickness direction is within 0.15, and a plate thickness t is preferably within the range of $D/2 \le t \le 20D$ when the plate thickness of the transparent substrate is t (mm), and a size in the thickness direction of the transparent substrate is D (mm). Moreover, the shape of the light emitter may be plate-shaped, bar-shaped, and tubular-shaped.

Furthermore, another aspect of the light emitter according to the present invention is a light emitter using a transparent substrate including light diffusing particles, in which the light emitter includes at least light diffusing particles with an absolute value of a refractive index difference $\Delta n$ between a refractive index of the transparent substrate and the refractive index of the light diffusing particles is greater than or equal to 0.3 and less than or equal to 3, and concentration of the light diffusing particles is greater than or equal to 0.0001 weight % and less than or equal to 0.01 weight %.

This light emitter uses a transparent substrate that satisfies the abovementioned refractive index difference $\Delta n$ and the concentration of light diffusing particles. Then, it works as a transparent plate at the time of extinction and realizes highly efficient light emission at the time of lighting.

Advantageous Effects of Invention

According to an aspect of the light emitter of the present invention, it is possible to ensure transparency by lowering the haze value in the thickness direction or diameter direction at the time when the light source is turned off, and enables highly efficient light emission by using plate-surface transversal radiant emitted light when the light source is turned on.

DESCRIPTION OF EMBODIMENTS (First Exemplary Embodiment)

Hereinafter, as for a first exemplary embodiment of the present invention, a plate-shaped surface light emitter is explained as an example of a light emitter. The surface light emitter according to the first exemplary embodiment of the present invention uses a light guide including light diffusing particles. When light is supplied from a light source, the light guide guides the light in the length direction of the light guide while scattering the light in the thickness direction of the light guide. The length direction of the light guide is a direction to an opposing end surface from an end surface (incident end surface) for supplying the light from the light source, and is parallel to a direction in which the supplied light-guiding light travels in a straight line. The thickness direction of the light guide is a direction to indicate the thickness of the light guide, and perpendicular to the length direction. Further, the direction perpendicular to both of the length direction of the light guide and the thickness direction of the light guide shall be the width direction of the light guide. In addition, the light guide is explained using a case of being plate-shape. The shape of the light guide may be a mode which changes the thickness in the length direction and/or the width direction (wedged cross-section).

Figure 1:
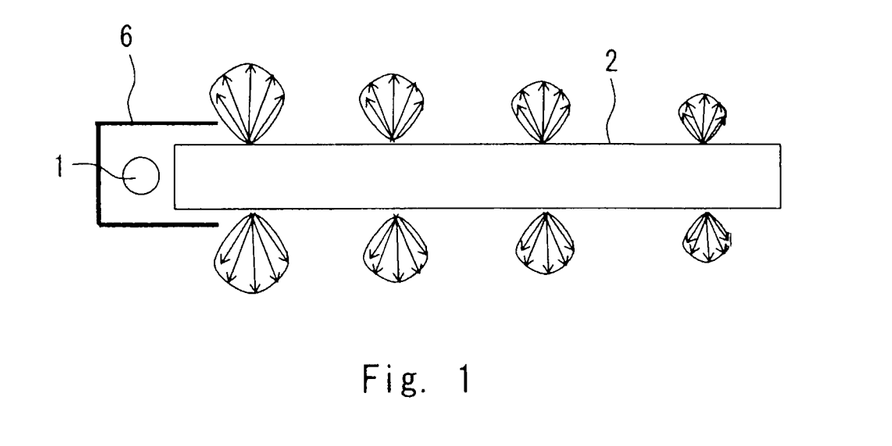
FIG. 1 is a view showing an example of a surface light emitter according to a first exemplary embodiment of the present invention.

FIG. 1 shows an example of the surface light emitter. In FIG. 1, a light source 1 is placed at an end of a surface light emitter 2. Moreover, a reflective cover 6 for efficiently using light is placed in the circumference of the light source 1. In FIG. 1, the light source 1 is placed on the left-hand side of the surface light emitter 2, and guides light to an end surface opposed to an incident surface from the incident end surface of the surface light emitter 2.

Further, in FIG. 1, the arrow group shown in the both sides of the surface light emitter 2 schematically indicates the state of diffusing light. The light entered from the light source 1 to the incident end surface of the surface light emitter 2 is guided to the end surface opposed to the incident surface of the surface light emitter 2. In the meantime, this light is diffused by the light diffusing particles, and is emitted from the front surface and the rear surface of the surface light emitter 2. The amount of the light emitted decreases as the light guide distance increases.

Additionally, the light guide of this exemplary embodiment is composed so that the haze value in the thickness direction of the light guide may be less than or equal to 30%.

Further, the light guide has a characteristic that a calculated value $(m^{-1}/\%)$ obtained by dividing the luminance attenuation coefficient $E(m^{-1})$ by a haze value (%) per 5 (mm) thickness is greater than or equal to 0.55 $(m^{-1}/\%)$ and less than or equal to 10.0 $(m^{-1}/\%)$.

The calculated value indicates one characteristic concerning the luminance, and is an index to define a light guide with high transparency while realizing highly efficient light emission. As the calculated value is calculated using the luminance attenuation coefficient $E(m-1)$, firstly the luminance attenuation coefficient $E(m^{-1})$ is explained.

The luminance attenuation coefficient $E(m^{-1})$ in the present invention means the gradient in the case of representing luminance characteristics by plotting logarithm of luminance value of light emitted in the direction perpendicular to a light emitting surface contacting an end surface and the distance from the end surface when light enters to the end surface from a light source placed to the end surface of the surface light emitter. Note that as the luminance attenuation coefficient E uses the result of measuring the luminance of predetermined parts (parts) by the unit of an arbitrary length (m), it shall be represented by $(m^{-1})$ or (parts/m). In the following explanation, $(m^{-1})$ is used to explain.

The measurement result of the luminance follows the formula (1) theoretically. Here, the measured luminance value is represented U(x) and the theoretical luminance value is represented by B(x).

$$B(x)=B(0)\times\exp(-E\times x) \quad (1)$$

Here, $x(x\geq 0)$ represents the distance (light guide distance) from the incident end surface.

Moreover, the luminance attenuation coefficient E $(m^{-1})$ shall be derived with care on the followings.

1. A material that absorbs light, such as a black cloth, is placed to the rear surface of the light guide. This is to absorb the light emitted at the rear surface in order to facilitate the analysis. Here, the side to be measured its luminance shall be the front surface, and the opposing side shall be the rear surface.

2. There are cases that the luminance characteristics do not follow the formula (1) by the influence of light reflection from the end surface near the end surface opposed to the incident surface. Therefore, in order to remove this influence, an absorption process is performed to the end surface opposed to the incident surface and a measurement is performed. As the absorption process method, there is, for example, a coat of black ink to the end surface opposed to the incident surface. When a mirror is placed to the end surface opposed to the incident surface, the absorption process is performed after removing the mirror.

3. As there are cases that the luminance characteristics do not follow the formula (1) near the incident end surface, the corresponding part is excluded at the time of deriving the luminance attenuation coefficient E(m−1). For example, suppose that the luminance attenuation coefficient E and the calculated value are derived according to the luminance characteristics at L/2 and L/3 in the incident end surface direction from the end surface opposed to the incident surface, for example. At this time, L is the distance (m) from a light source incident end surface to the opposing end surface. The reason that there are cases in which the luminance characteristics do not follow the formula (1) near the incident end surface is not clear. In regard to this, the trend that it tends to be generated in a configuration with smaller amount of light diffusing particles and larger refractive index difference $\Delta n$ is considered to relate with this. Therefore, one of the reasons is assumed that the diffusion angle distribution of light in the light guide near the incident end surface is different from the diffusion angle distribution of light in the light guide at L/2 or L/3 in the incident end surface direction, or because of the influence of the reflection at the reflective cover of the light source.

4. The luminance attenuation coefficient $E(m^{-1})$ is derived by straight line approximation in the range from the end surface opposed to the incident surface to L/2 (center of the surface light emitter) or L/3 using the luminance characteristics diagram shown in FIG. 4 described later.

Figure 2:
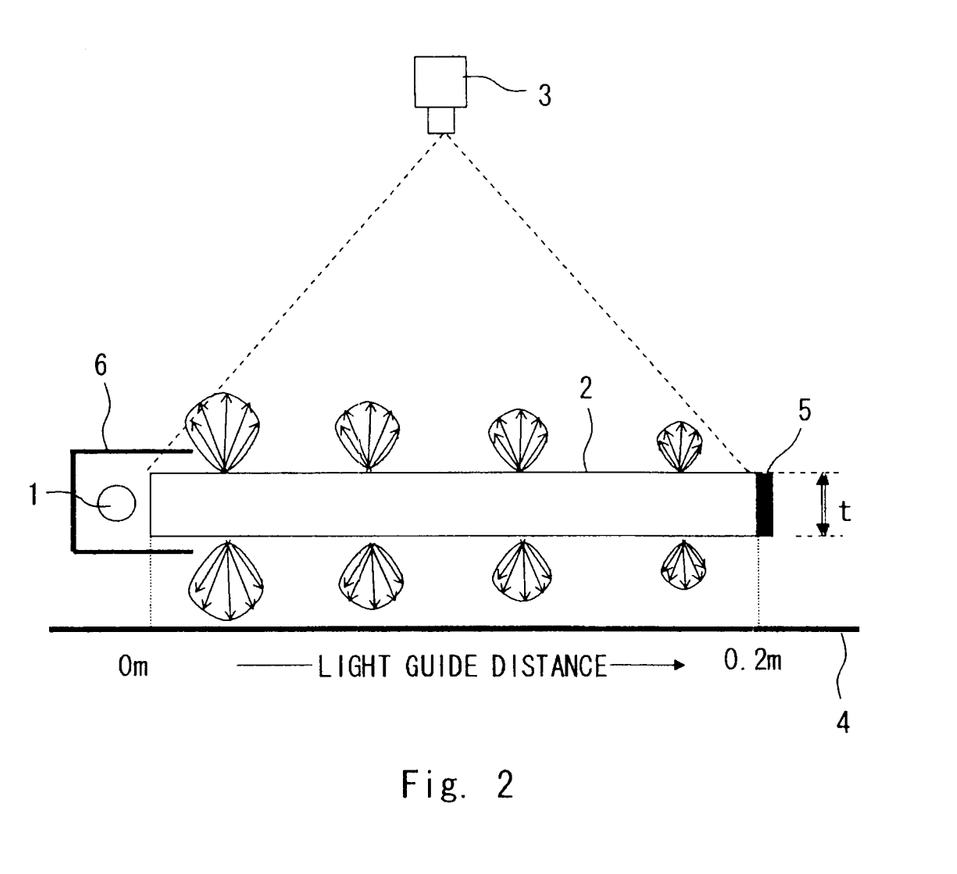
FIG. 2 is a view showing an example of a luminance distribution measuring system of the surface light emitter according to the first exemplary embodiment of the present invention.

An example of the luminance distribution measurement system of the surface light emitter is shown in FIG. 2. In FIG. 2, the light source 1, the surface light emitter 2, and a luminometer 3 are included. Further, an absorbing sheet 4 that absorbs light emitted to the rear surface side is placed to the rear surface side of the surface light emitter 2. An absorption process 5 is performed to the end surface opposed the incident surface of the surface light emitter 2. The reflective cover 6 for efficiently using light is placed in the circumstance of the light source 1. In FIG. 2, the light source 1 is placed on the left-hand side of the surface light emitter 2, and light is guided to the end surface opposed to the incident surface from the incident end surface of the surface light emitter. The position of the incident end surface shall be 0 m, and an arbitrary distance to the end surface opposed to the incident surface shall be a light guide distance. In FIG. 2, the maximum light guide distance shall be 0.2 m. The luminometer 3 uses a CCD (Charge Coupled Device) camera, for example. In FIG. 2, t indicates the plate thickness of the surface light emitter 2 (light guide).

Figure 3:
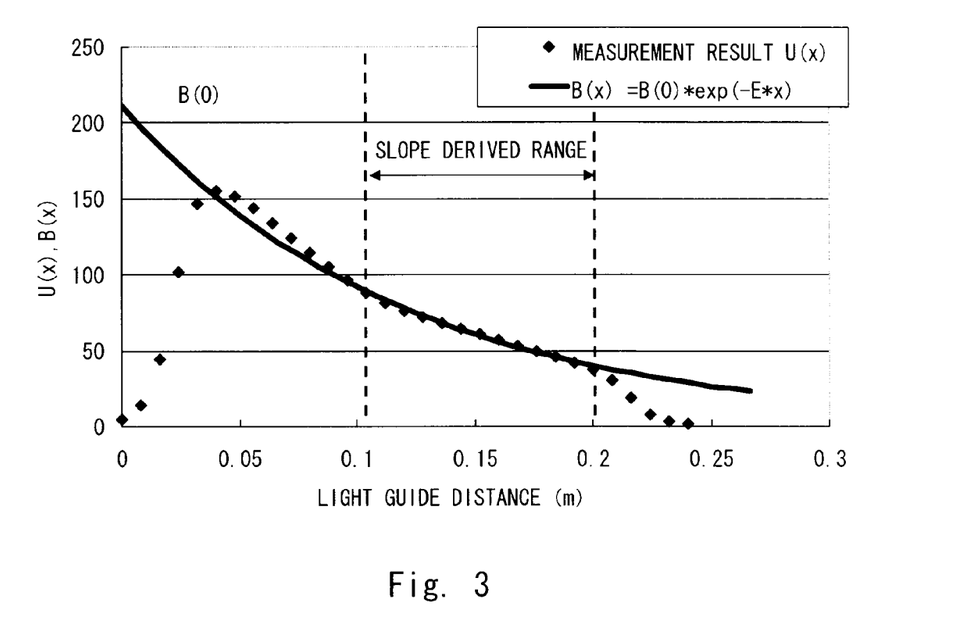
FIG. 3 is a view showing an example of a luminance distribution measurement result of the surface light emitter according to the first exemplary embodiment of the present invention.
Figure 4:
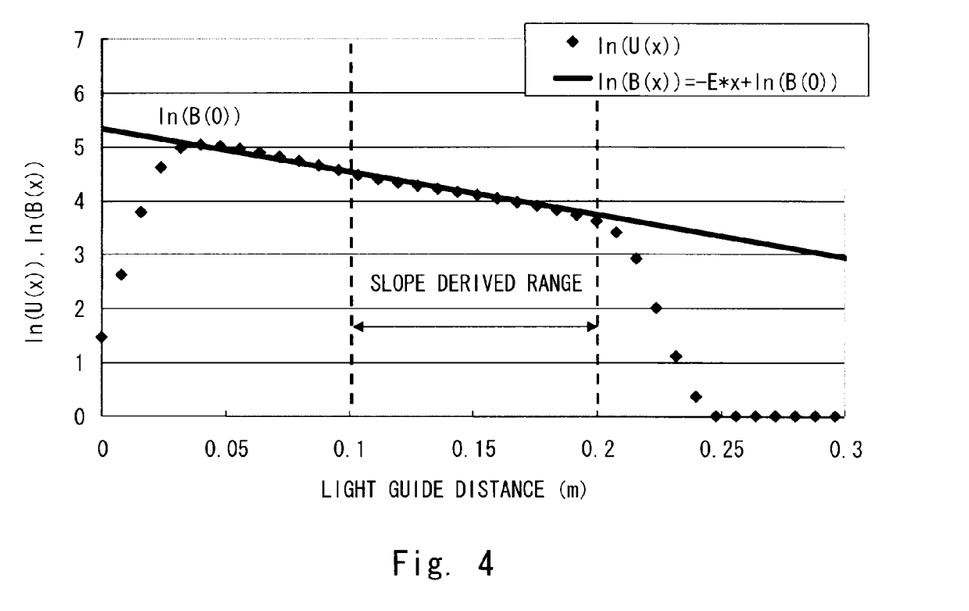
FIG. 4 is a view showing an example of a logarithmic plot of the luminance distribution of the surface light emitter according to the first exemplary embodiment of the present invention.

FIG. 3 shows a view plotting an example of the measured luminance value $U(x)(cd/m^2)$ and the distance from the incident end surface. FIG. 4 shows the luminance characteristics diagram plotting logarithm $\ln(U(x))$ of the luminance value $U(x)(cd/m^2)$ and the distance $x(m)$ from the incident end surface.

Here the theoretical luminance value $B(0)(cd/m^2)$ is a hypothetical luminance value to calculate according to the luminance characteristics deriving method that defines the luminance value and the luminance attenuation coefficient, calculates the luminance characteristics, and derives the luminance characteristics. Specifically, it is a hypothetical luminance value calculated in which a value when an approximation line, obtained by straight-line approximation in the range from the end surface opposed to the incident surface to L/2 (center of the surface light emitter), that is extended to x=0(m) crosses the vertical axis is $\ln(B(0))$.

Next, the relationship between the luminance attenuation coefficient $E(m^{-1})$ and the luminance is explained. The luminance attenuation coefficient $E(m^{-1})$ indicates that larger the value is, more light can be extracted per unit length in the light guide direction.

Figure 5:
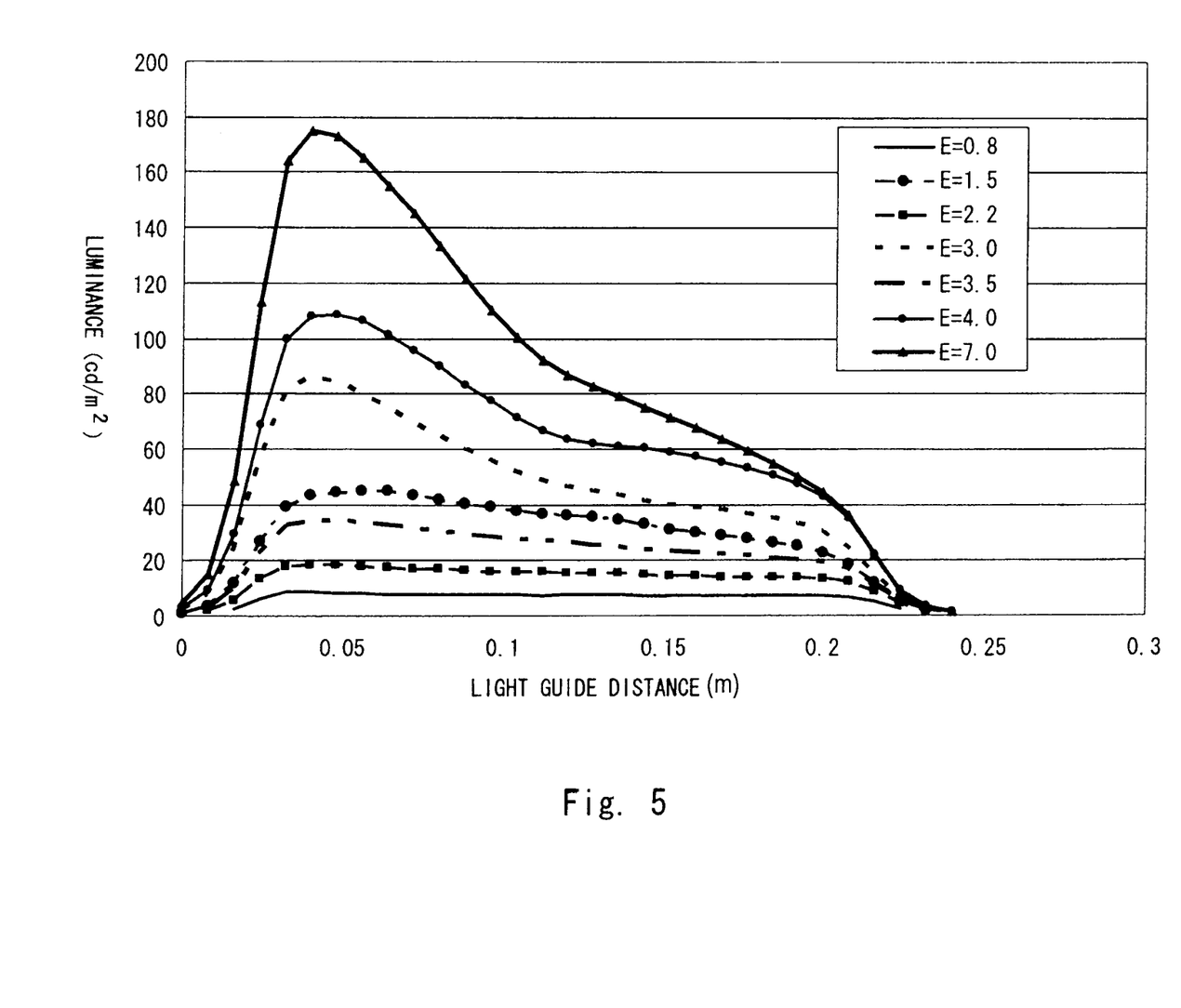
FIG. 5 is a view showing a related example of a luminance value B(x) and a light guide distance x(m) in the case that a luminance attenuation coefficient E is different in the surface light emitter according to the first exemplary embodiment of the present invention.

FIG. 5 shows a related example between the theoretical luminance value $B(x)$ and the light guide distance $x(m)$ in the case in which the luminance attenuation coefficients $E(m^{-1})$ are different.

The related example of FIG. 5 is the one that measured the luminance of the surface light emitter, in which the substrate is added to the diffusion material, and 0.02 to 0.0005 weight % of one kind of diffusion material with a particle diameter of 0.5 to 3 μm selected from titanium oxide, zinc oxide, barium sulfate, aluminum oxide, and polystyrene is added to the surface light emitter with 5 mm thickness. In each luminance attenuation coefficient E, it is the case in which the light guide distance is 0.2 (m). At this time, reduction of B(x) is larger as the luminance attenuation coefficient E $(m^{-1})$ is greater. That is, it can be seen that as a result of extracting more light from the surface light emitter 2, the reduction of B(x) becomes large.

Figure 6:
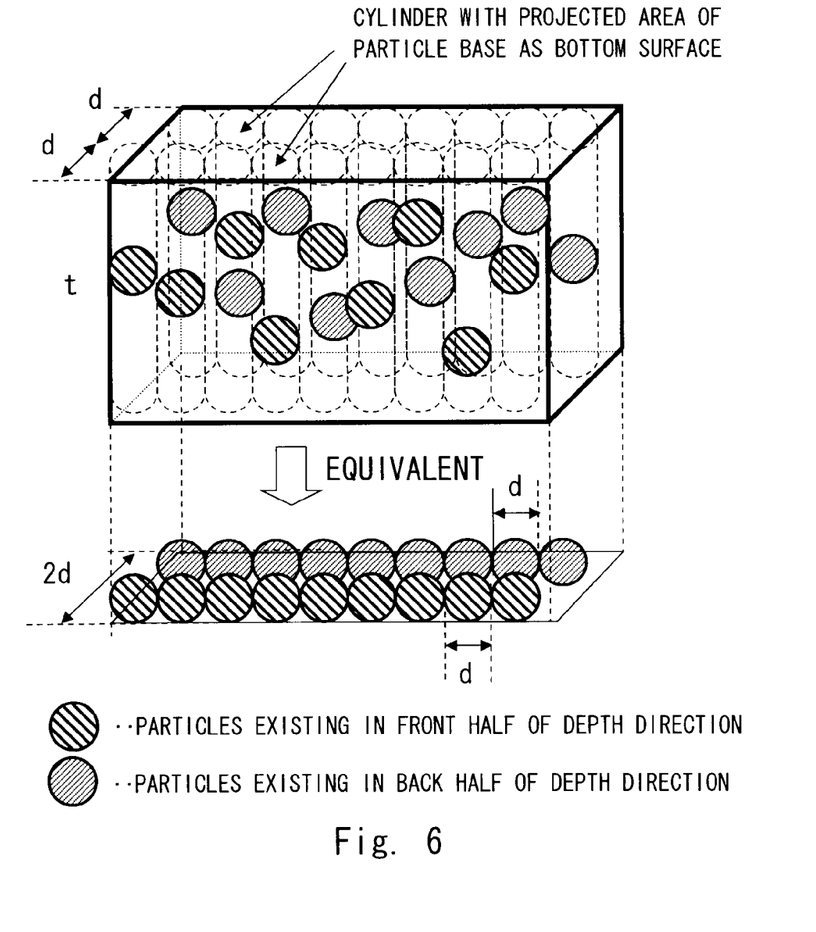
FIG. 6 is a view explaining the number of layers of the surface light emitter according to the first exemplary embodiment of the present invention.

Next, the number of layers $S_1$ defined in the present invention is explained. The number of layers S1 is equivalent to the area of projecting total cross-section of the light diffusing particles existing in the surface light emitter 2 onto its light emitting surface. Then, the density in the thickness direction of the light diffusing particles can be evaluated. More specifically, the number of particle layers $S_1$ in the thickness direction of the light guide is defined by the formula (2). For example, the number of particle layers $S_1$ in the state in which the bottom surface is covered without a gap is one. FIG. 6 is an example of projecting the total cross-section of the light diffusing particles included in the light guide onto the bottom surface of the light guide (the surface light emitter 2).

$$S_1 \equiv n_3 \pi a^2 t = \frac{V_3}{4\pi a^3/3} \pi a^2 t = \frac{1.5 V_3 t}{d} \quad (2)$$

Here, $n_3$ is particle number density ($/mm^3$), t (mm) is the plate thickness, V3 is a particle volume fraction, d (mm) is a weight average particle diameter, and a (mm) is an average particle radius.

In the exemplary embodiment of the present invention, the particle diameter is the weight average particle diameter, and the particle radius is a weight average particle radius.

In the surface light emitter 2, in order to ensure transparency and enable highly efficient light emission, it is required to increase the luminance attenuation coefficient $E(m^{-1})$ while keeping the number of layer $S_1$ small. Specifically, by ensuring the transparency of the surface light emitter 2, the surface light emitter 2 can function as a transparent plate at the time of extinction. The transparency requires to make small the haze value of the light guide which composes the surface light emitter 2, and can be realized by lowering the number of layers $S_1$ shown in FIG. 6. Further, by emitting light highly efficiently, the surface light emitter 2 can function as a gobo at the time of lighting. Highly efficient light emission can be realized by increasing the above luminance attenuation coefficient E.

First, the haze value is examined. The transparency will be lost when the haze value exceeds 30%. The haze is preferably less than or equal to 20%, and less than or equal to 10% is especially preferable. Although there is no lower limit in particular, in order to realize high luminance, it shall be greater than or equal to 0.1% from the implications that the case of a transparent plate without light diffusing particles is not included. However, when highly efficient light emission can be realized, it is possible to use a light guide with the haze value of less than 0.1.

In the exemplary embodiment of the present invention, when the haze values differ in the surface of the surface light emitter 2, the haze value shall be evaluated at the place with the smallest haze value within the surface of the surface light emitter 2.

Next, the calculated value concerning the luminance is explained. As mentioned above, the calculated value ($m^{-1}$/%) is a value obtained by dividing the luminance attenuation coefficient E ($m^{-1}$) by the haze value per 5 mm thickness (%). The calculated value ($m^{-1}$/%) smaller than 0.55 is suitable for the one with a long light guide distance, however as the light extraction efficiency is small, the brightness at the time of lighting is not enough.

The calculated value ($m^{-1}$/%) greater than 10.0 has enough brightness at the time of lighting as the light extraction efficiency is large, however the light guide distance is short and is insufficient.

The surface light emitter 2 of this exemplary embodiment of the present invention may have constant concentration of the light diffusing particles in the thickness direction, or may have a multiple layer configuration composed of, for example, a light diffusing particles-containing layer and a transparent layer, or a multiple layer configuration composed of two or more layers with different concentration of light diffusing particles. In the case of the multiple layer configuration, the haze value per 5 mm thickness is obtained based on the measured haze value in a similar way to described above.

Moreover, in order to make the haze value be less than or equal to 30%, the number of layers $S_1$ is preferably less than or equal to 0.15. It is especially preferably to be less than or equal to 0.1.

The refractive index difference $\Delta n$ is preferably greater than or equal to 0.3. When the refractive index difference $\Delta n$ is smaller than 0.3, it is not possible to efficiently extract light and the transparency may deteriorate relative to the brightness at the time of lighting. Further, it is more preferable to be greater than or equal to 0.4. On the other hand, when the refractive index difference $\Delta n$ is larger than three, since backscattering becomes dominant, the transparency may also deteriorate relative to the brightness at the time of lighting.

When the average diameter of diffusion particles used in this exemplary embodiment of the present invention is small, there may be a change in the color, such as coloring considered to be caused by the Rayleigh scattering phenomenon. Furthermore, even when the refractive index difference $\Delta n$ is small, there may be a change in the color such as coloring considered to be caused by the Rayleigh scattering phenomenon. To be more specific, scattered light may be tinged with blue near the light source, and tinged with yellow at the position distant from the light source.

Therefore, in order to suppress the coloring considered to be caused by the Rayleigh scattering phenomenon, it is preferable that a product of the average diameter (mm) of particles and a refractive index difference absolute value is greater than or equal to 0.0001 (mm).

Moreover, the plate thickness t (mm) of the surface light emitter 2 is preferably in the range of D/2≤t≤20 D for the size D (mm) in the plate thickness direction of the light source.

Figure 7A:
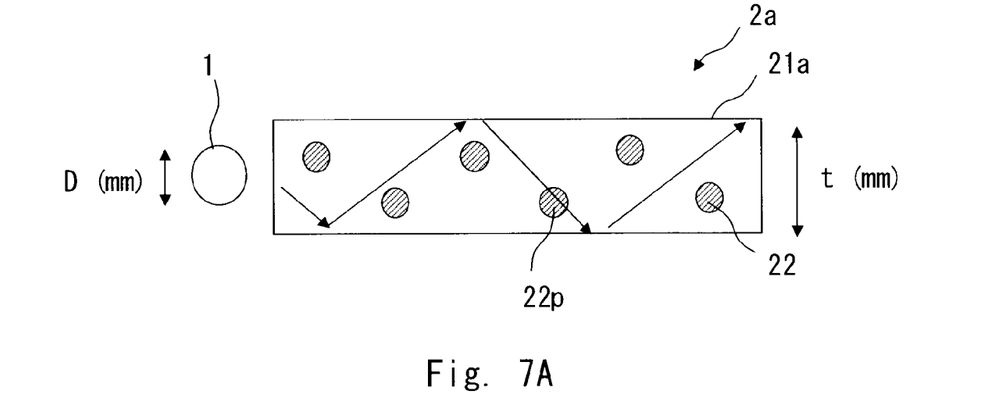
FIG. 7A is a view explaining a relationship between a thickness (t) of a light guide and concentration of light diffusing particles in the surface light emitter according to the first exemplary embodiment of the present invention.
Figure 7B:
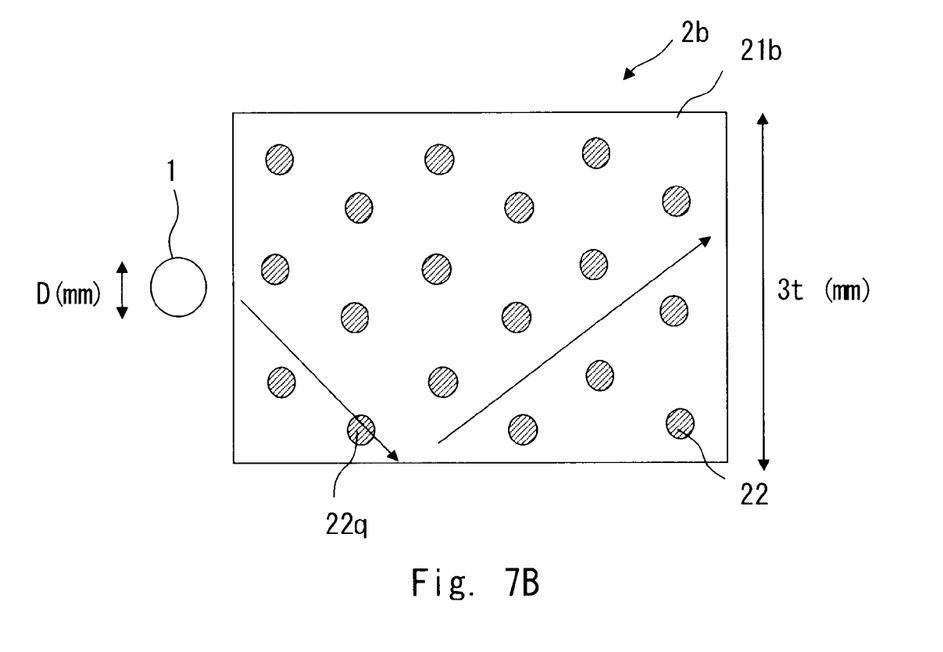
FIG. 7B is a view explaining a relationship between a thickness (t) of the light guide and concentration of light diffusing particles in the surface light emitter according to the first exemplary embodiment of the present invention.

This reason is explained using FIGS. 7A and 7B. FIG. 7A shows a pattern diagram of a surface light emitter 2a composed of a light guide 21a with concentration C (weight %) of light diffusing particles 22 and a thickness t (mm) of a substrate. FIG. 7B shows an example of a surface light emitter 2b composed of a light guide b with the concentration C (weight %) of the light diffusing particles 22 and the thickness 3t (mm). The plate thickness of the light guide 21b is three times of the board thickness of the light guide 21a.

As the total amount of the light diffusing particles 22 included in the light guide 21b is greater than the light diffusing particles 22 included in the light guide 21a, the emission intensity seems to be greater. However, in the surface light emitters 2a and 2b shown in FIGS. 7A and 7B, light-guiding light advances inside the surface light emitters 2a and 2b while repeating total reflection. Therefore, when the concentration of light diffusing particles is same, the probability in which the light-guiding light is diffused by the light diffusing particles is same in the cases of FIGS. 7A and 7B. For example, FIG. 7A shows the case in which light is diffused by light diffusing particles 22p, and FIG. 7B shows the case in which light is diffused by light diffusing particles 22q. Thus, the luminance of the light emitting surface is the same in FIG. 7A and FIG. 7B.

On the other hand, as the plate thickness t of the surface light emitter 2a in FIG. 7A is thinner than the plate thickness 3t of the surface light emitter 2b in FIG. 7B, the haze value is small and transparency is high. Therefore, the surface light emitter of the present invention is preferably thinner.

However, since when the plate thickness becomes smaller than the size of the light source, the rate of light that enters the end surface becomes small, thus the utilization efficiency of light may become small. Therefore, the plate thickness t (mm) of the surface light emitter is preferably in the range of D/2≤t≤20 D for the size D (mm) in the plate thickness direction of the light source. It is more preferable to be in the range of D≤t≤15 D.

Moreover, when the substrate of the surface light emitter is formed of transparent plastic such as acrylic resin, the thickness t is preferably greater than or equal to 0.5 mm with consideration over its rigidity. Additionally, it is more preferable to be in the range of t≥L/400 for the length of the light guide L (mm).

When manufacturing the surface light emitter of the present invention is made by extrusion molding, the thickness thereof is preferably less than or equal to 20 mm for the ease of manufacture.

As explained above, an aspect of the surface light emitter according to the first exemplary embodiment of the present invention is a surface light emitter using the light guide including light diffusing particles, in which the light is guided in the length direction of the light guide while scattering the light in the thickness direction of the light guide, the haze value in the thickness direction of the light guide is less than or equal to 30%, and also the calculated value ($m^{-1}$/%) obtained by dividing the luminance attenuation coefficient E($m^{-1}$) by the haze value per 5 (mm) thickness of the light guide is greater than or equal to 0.55 ($m^{-1}$/%) and less than or equal to 10.0 ($m^{-1}$/%). This surface light emitter works as a transparent plate by using the light guide of the low haze value at the time of extinction, and realizes highly efficient light emission by the light diffusing particles included in the light guide at the time of lighting. Accordingly, the display device working as a backlight or a gobo can be realized.

Further, in an aspect of the surface light emitter according to this exemplary embodiment, the light guide preferably includes at least light diffusing particles with an absolute value of the refractive index difference Δn between the refractive index of the substrate of the light guide and the refractive index of the light diffusing particles is greater than or equal to 0.3 and less than or equal to 3, and the light diffusing particles are composed of particles having a weight average diameter where a product of the absolute value of the refractive index difference Δn and the weight average diameter d (mm) of particles is greater than or equal to 0.0001 (mm).

Furthermore, as for the light guide, it is preferable to be configured that the number of particle layers $S_1$ in the thickness direction is less than or equal to 0.15, and when the plate thickness of the light guide is t (mm) and the size in the thickness direction of the light guide, which supplies light from the end surface of the light guide, is D (mm), the plate thickness t is preferably in the range of $D/2 \leq t \leq 20 D$.

(Second Exemplary Embodiment)

The first exemplary embodiment explained the plate-like surface light emitter as an example of the light emitter. A second exemplary embodiment explains the case of other shapes of the light emitter. An example of the light emitter of this exemplary embodiment is explained using FIGS. 8A to 8D and 9.

Figure 8A:
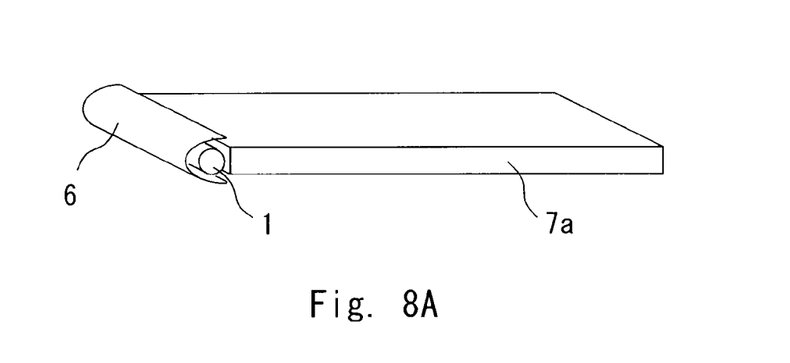
FIG. 8A is a view showing a case of a rectangle as an example of a shape of a light emitter according to a second exemplary embodiment of the present invention.

As for the shape of the surface light emitter, which is one exemplary embodiment of the light emitter, other than the light emitter 7a such as a rectangle as in FIG. 8A, the shape viewed from the front surface may be polygons including a rectangle, a trapezoid, and a triangle, or shapes formed by curves including a circle and an ellipse. Additionally, the surface light emitter may be a wing-shaped light emitter 7b (FIG. 8B), a frame-shaped light emitter 7c (FIG. 8C), or other shapes formed by curves and straight lines.

Figure 8B:
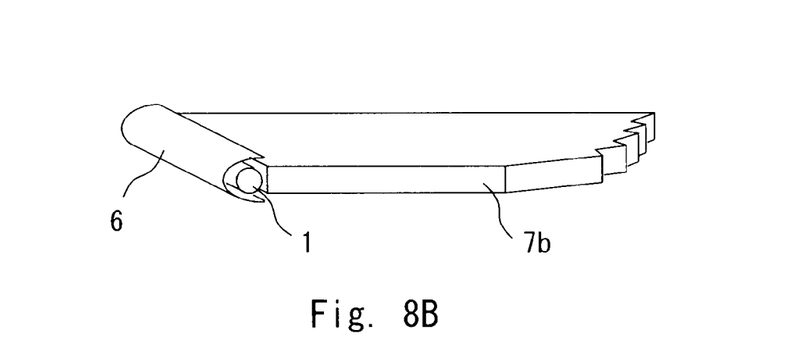
FIG. 8B is a view showing a case of a winged shape as an example of the shape of the light emitter according to the second exemplary embodiment of the present invention.
Figure 8C:
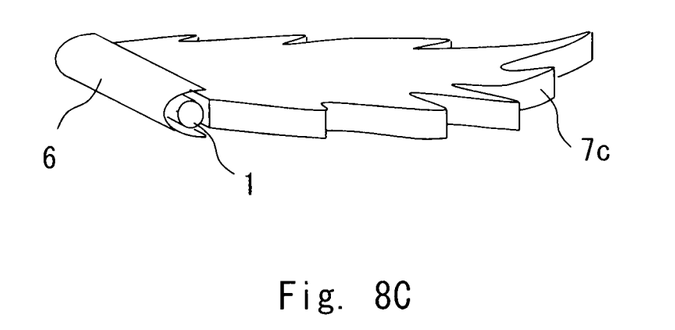
FIG. 8C is a view showing a case of a flame shape as an example of the shape of the light emitter according to the second exemplary embodiment of the present invention.
Figure 8D:
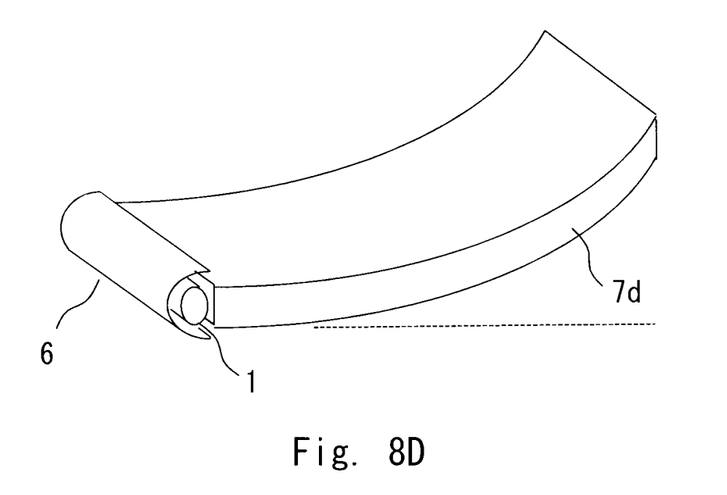
FIG. 8D is a view showing a case of a curved shape as an example of the shape of the light emitter according to the second exemplary embodiment of the present invention.

Moreover, the surface light emitter is not limited to the plate shape as shown in FIGS. 8A to 8C, but may be bent as shown in FIG. 8D. In FIG. 8D, a line parallel to the base of the incident end surface is indicated using the dotted line, so as to easily understand the bent state of the shape. Although FIG. 8D shows the status that the same shape as FIG. 8A is bent, other shapes, such as FIGS. 8B and 8C, may be bent.

Although FIGS. 8A to 8D show the shapes with constant plate thickness of the light emitters, the thickness of the plate may not be constant. Further, the width of the plate may not be constant. For example, the light emitter may be the above-mentioned polygons, a circle, and an ellipse, and may not have the same width as the width of the light source 1. However, the incident end surface opposed to the light source 1 preferably has at least the same width or wider width as the light source 1 in order to efficiently use light.

Moreover, the light emitter is not limited to the surface light emitter.

The light emitter may be bar-shaped. As for the shape of the bar-shaped light emitter, there are, for example, a cylindrical shape, a prismatic shape, a cone shape, and a pyramid shape. The diameter may not be constant.

Further, the light emitter may be cylindrical-shaped. As for the shape of the cylindrical light emitter, there are, for example, a cylindrical shape, a rectangular cylinder shape, a hollow cone shape, and a hollow pyramid shape.

Figure 9:
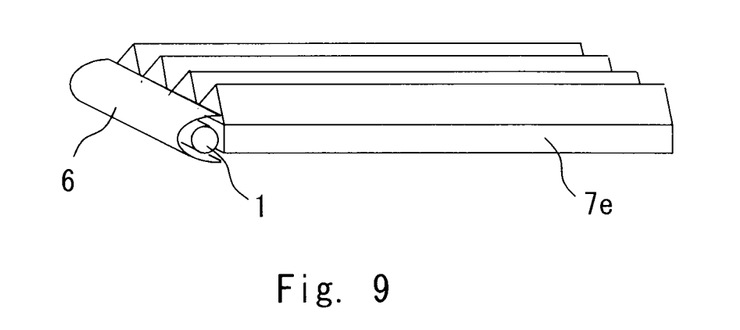
FIG. 9 is a view showing a case of including a prism shape as an example of the light emitter according to the second exemplary embodiment of the present invention.

Furthermore, the shape of the light emitter may be provided with, for example, a prism shape to one surface of the light emitter. An example is shown in FIG. 9. Additionally, it is not limited to the prism shape, but other shapes formed of, for example, a waveform, a curved surface, and a sloped surface may be added to one surface of the light emitter. In each case, the light emitter surface is preferably smooth in an extent that light entered inside could lead a total reflection.

Next, the relationship between kind of the diffusion material of this exemplary embodiment and the luminance is explained. Also in this exemplary embodiment, the luminance can be measured using a luminance measuring system of FIG. 2 in a similar manner as the first exemplary embodiment. However, although the haze value can be measured for the shapes including a plate part as in the light emitters 7a to 7d, it cannot be measured in the case when there is no plate part as in the light emitter 7e. In such a case, a plate-shaped light emitter is formed with the same the transparent substrate composing the light emitter and the light diffusing particles, so as to perform the measurement. Therefore, this exemplary embodiment examines the relationship between the kind of diffusion material and the luminance.

The luminance ($cd/m^{-2}$) shall be measured with care on the followings.

1. A material that absorbs light, such as a black cloth, is placed to the rear surface of the light guide as the absorbing sheet 4. This is to absorb light emitted to the rear surface side, and measure only the light emitted from the front surface. Here, the side to measure the luminance shall be the front surface, and the opposing side is the rear surface.

2. The luminance characteristics may change by the influence of light reflection from the end surface near the end surface opposed to the incident surface. Therefore, in order to remove this influence, the absorption process 5 is performed to the end surface opposed to the incident surface and a measurement is performed. As the absorption process method, there is, for example, a coat of black ink to the end surface opposed to the incident surface.

The relationship between the kind of diffusion material and the luminance is examined using the related example between the luminance value B(x) and the light guide distance x(m) of the surface light emitter in the case when the kind of diffusion material or the concentration differs.

The related example of FIG. 5 is the one that measured the luminance of the surface light emitter, in which the substrate is added to the diffusion material. The surface light emitter with 5 mm thickness is added 0.02 to 0.0005 weight % of one kind of diffusion material selected from titanium oxide, zinc oxide, barium sulfate, aluminum oxide, and polystyrene with a particle diameter 0.5 to 3 μm. In each example, it is the case in which the light guide distance is 0.2 (m). At this time, it can be seen that the luminance characteristics largely change by the kind and concentration of the diffusion material.

The present inventors have found, as a result of examinations of various light emitters with different kind or concentration of the diffusion material, that the light emitter having a specific range of refractive index difference and added with a specific range of concentration excels in the balance of the transparency at the time of extinction and the luminance at the time of lighting.

The refractive index difference Δn is preferably greater than or equal to 0.3. When the refractive index difference Δn is smaller than 0.3, light cannot be efficiently extracted, and the transparency deteriorates relative to the brightness at the time of lighting. Further, it is preferable to be greater than or equal to 0.4.

On the other hand, when the refractive index difference Δn is larger than three, since backscattering becomes dominant, the transparency also deteriorates relative to the brightness at the time of lighting.

As a combination of the substrate and diffusion material of such light emitter, for example, light diffusion material microparticles such as titanium oxide and zinc oxide for transparent resin such as acrylic resin, polycarbonate resin, and styrene resin can be adopted.

When the average diameter of diffusion particles used in this exemplary embodiment of the present invention is small, there may be a change in color, such as coloring considered to be caused by the Rayleigh scattering phenomenon. Further, even when the refractive index difference Δn of diffusion particles used in this exemplary embodiment of the present invention is small, there may be a change in the color, such as coloring considered to be caused by the Rayleigh scattering phenomenon. To be more specific, scattered light may be tinged with blue near the light source, and tinged with yellow at the position distant from the light source.

Therefore, in order to suppress the coloring considered to be caused by the Rayleigh scattering phenomenon, it is preferable that a product of the average diameter (mm) of particles and the absolute value of the refractive index difference is greater than or equal to 0.0001 (mm).

Moreover, the concentration of light diffusing particles is preferably greater than or equal to 0.0001 weight % and less than or equal to 0.01 weight %. Along with the concentration of the light diffusing particles being higher, the transparency of the light emitter is lower. Therefore, in order to maintain the transparency of the light emitter, such as, a low haze value in the case of the plate-shaped light emitter, and visual transparency in the case of others than the plate shape, it is required to suppress the concentration of the light diffusing particles to be low. On the other hand, when the concentration of the light diffusing particles is too low, light cannot be sufficiently scattered, and the luminance of the light emitter may be too small.

(Other Exemplary Embodiments)

The shape of the light source used in the present invention can be arbitrarily selected according to the design at the time of light emission, for example, dotted and circular other than linear can be adopted.

EXAMPLE

Example 1

Examples and comparative examples are shown below. The surface light emitter was manufactured using an injection molding machine. Common conditions for the example and the comparative example are shown below.

<Common Conditions>

Base resin: PMMA (acrylic resin) ("Parapet" manufactured by Kuraray Co., Ltd.)

Refractive index: 1.494 (nD)

Sample size: 5 mm thickness×Light guide length 200 mm×width 70 mm

Light source used: "LED NFSW036BT" manufactured by Nichia Corporation

Number of usage: Seven

Spacing: 10 mm

Applied voltage: 2.8 V/one light source

The size of one light source: 3 mm (light emitting unit)

Figure 10:
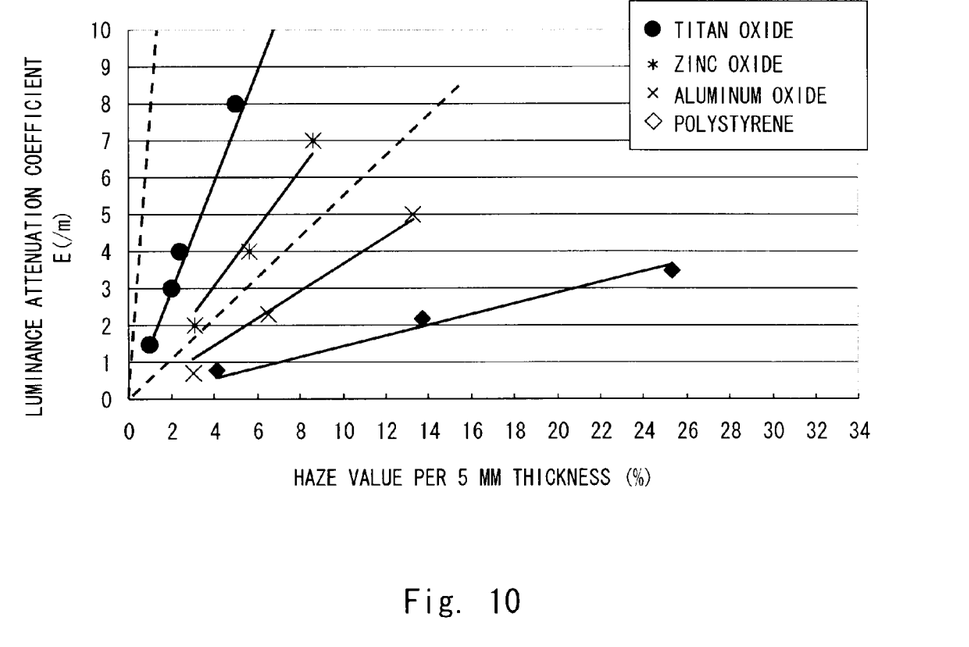
FIG. 10 is a view showing a relationship between the luminance attenuation coefficient E and a haze value per 5 mm in the surface light emitter according to an example of the present invention.

The material configuration and measurement result of the example and the comparative example are shown in Table 1. The relationship between the luminance attenuation coefficient $E(m^{-1})$ and the haze value per 5 mm thickness is shown in FIG. 10. The haze value of the horizontal axis is the haze value per 5 mm thickness as mentioned above. From the measurement result shown in FIG. 10, when the haze value (%) is x and the luminance attenuation coefficient $E\ (m^{-1})$ is y, the following formula is derived.

Titanium oxide y=1.4797x

Zinc oxide y=0.7726x

Aluminum oxide y=0.3662x

Styrene y=0.1444x

In this relational expression, the coefficient of x is equivalent to the calculated value $(m^{-1}/\%)$.

Further, in FIG. 10, the range in which the calculated value is greater than or equal to 0.55 $(m^{-1}/\%)$ and less than or equal to 10.0 $(m^{-1}/\%)$ is indicated by the two dashed lines. The relational expression of the right dashed line is y=0.55x, and the left dashed line is y=10.0x.

In the Examples 1 and 2, the calculated value is approximately 0.77 to 1.48 (m-1/%), and the haze value is 1 to 8.6%.

In the comparative examples 1 and 2, the calculated value is approximately 0.14 to 0.37 $(m^{-1}/\%)$, and the haze value is 3 to 25.3%.

In addition, it has been found out from the result of the table 1, that the value of $S_1$ is preferably less than or equal to 0.15 in order to have the haze value less than or equal to 30%.

TABLE 1

[Example and comparative example and the configuration thereof]

| | Diffusion material | Refractive index difference Δn nD | Average particle diameter d(mm) | Δn × d (mm) | Additive concentration (%) | Number of layer in plate thickness direction S1 | Number of layer in light guide direction S2 | Haze value (%) JIS K 7136 | E $(M^{-1})$ | Calculated value |
|---|---|---|---|---|---|---|---|---|---|---|
| Example 1 | Titanium oxide | 1.226 | 0.0010 | 0.0012 | 0.00014% | 0.003 | 0.12 | 1.0% | 1.5 | 1.48 |
| | | | | | 0.00028% | 0.006 | 0.23 | 2.0% | 3.0 | |
| | | | | | 0.00038% | 0.008 | 0.31 | 2.4% | 4.0 | |
| | | | | | 0.00075% | 0.016 | 0.63 | 5.0% | 8.0 | |
| Example 2 | Zinc oxide | 0.456 | 0.0005 | 0.0002 | 0.00050% | 0.016 | 0.63 | 3.1% | 2.0 | 0.77 |
| | | | | | 0.00100% | 0.032 | 1.26 | 5.6% | 4.0 | |
| | | | | | 0.00169% | 0.053 | 2.13 | 8.6% | 7.0 | |
| Comparative example 3 | Aluminum oxide | 0.266 | 0.0022 | 0.0006 | 0.00100% | 0.011 | 0.45 | 3.0% | 0.7 | 0.37 |
| | | | | | 0.00250% | 0.028 | 1.12 | 6.5% | 2.3 | |
| | | | | | 0.00510% | 0.057 | 2.28 | 13.3% | 5.0 | |
| Comparative example 4 | Polystyrene | 0.096 | 0.0030 | 0.0003 | 0.00072% | 0.020 | 0.82 | 4.1% | 0.8 | 0.14 |
| | | | | | 0.00289% | 0.082 | 3.28 | 13.7% | 2.2 | |
| | | | | | 0.00579% | 0.164 | 6.56 | 25.3% | 3.5 | |

The transparency at the time of extinction and the brightness at the time of lighting are evaluated in five levels by visual evaluation for the surface light emitters of these examples and comparative examples. The highest one is five and the lowest one is one, and in this evaluation, three or greater shall be favorable. The result is summarized in the table 2. As shown in the table 2, the surface light emitters of the examples excel in the transparency and also are bright. On the other hand, the surface light emitters of the comparative examples were inferior in transparency or dark.

TABLE 2

[Evaluation result of example and comparative example]

| | Haze value (%) | Calculated value $(m^{-1}/\%)$ | Transparency | Brightness 50 mm from light source | Brightness 150 mm from light source |
|---|---|---|---|---|---|
| Example 1 | 1.0 | 1.48 | 5 | 4-5 | 3 |
| | 2.0 | | 5 | 5 | 4 |
| | 2.4 | | 5 | 5 | 5 |
| | 5.0 | | 4 | 5 | 5 |
| Example 2 | 3.1% | 0.77 | 4 | 5 | 4 |
| | 5.6% | | 4 | 5 | 5 |
| | 8.6% | | 3 | 5 | 5 |
| Comparative example 1 | 3.0% | 0.37 | 5 | 1-2 | 1-2 |
| | 6.5% | | 4 | 3 | 2-3 |
| | 13.3% | | 2 | 5 | 4 |
| Comparative example 2 | 4.1% | 0.14 | 4 | 1 | 1 |
| | 13.7% | | 2 | 2 | 1-2 |
| | 25.3% | | 1 | 3 | 2 |

Example 2

In examples 3 and 4, and comparative examples 3 and 4, as for the sample size, a cylindrical shape with the diameter of 10 mm and the length of 200 mm is used, and the number of used light source is one. As for the diffusion material, the examples 3 and 4 are respectively same as the examples 1 and 2, and the comparative examples 3 and 4 are respectively same as the comparative examples 1 and 2.

Visual evaluation of the transparency at the time of extinction and the brightness at the time of lighting is performed for these bar-shaped light emitters of the examples 3 and 4 and the comparative examples 3 and 4. As a result, the light emitters of the examples were excellent in the transparency, and also bright. On the other hand, the light emitters of the comparative examples were inferior in the transparency or dark.

As shown above, according to the light guide method surface light emitter of the present invention, it is possible to realize a display device which has high transparency at the time of extinction and bright at the time of lighting working as a backlight or a gobo. For example, an ornament for amusement can be realized.

The present invention is not limited to the above exemplary embodiments, but can be modified as appropriate without departing from the scope.

The present application claims priority rights of and is based on Japanese Patent Application No. 2009-084118 filed on Mar. 31, 2009 and Japanese Patent Application No. 2009-159444 filed on July 6 in the Japanese Patent Office, the entire contents of which are hereby incorporated by reference.

| Reference Signs List | |
|---|---|
| 1 | LIGHT SOURCE |
| 2, 2a, and 2b | SURFACE LIGHT EMITTER |
| 3 | LUMINOMETER |
| 4 | ABSORBING SHEET |
| 5 | ABSORPTION PROCESS |
| 6 | REFLECTIVE COVER |
| 21a and 21b | LIGHT GUIDE |
| 22, 22p, and 22q | LIGHT DIFFUSION PARTICLE |
| 7a to 7e | LIGHT EMITTER |

The invention claimed is:

1. A light emitter, comprising a transparent substrate comprising light diffusing particles, wherein,
the light emitter guides light in a length direction of the transparent substrate while scattering the light in a thickness direction of the transparent substrate, and
a calculated value $(m^{-1}/\%)$ obtained by dividing a luminance attenuation coefficient E $(m^{-1})$ by a haze value (%) per 5 (mm) thickness of the transparent substrate is greater than or equal to 0.55 $(m^{-1}/\%)$ and less than or equal to 10.0 $(m^{-1}/\%)$.

2. The light emitter of claim 1, wherein the transparent substrate comprises at least the light diffusing particles with an absolute value of a refractive index difference Δn between a refractive index of the substrate and a refractive index of the light diffusing particles is greater than or equal to 0.3 and less than or equal to 3.

3. The light emitter of claim 1, wherein concentration of the light diffusing particles is greater than or equal to 0.0001 weight % and less than or equal to 0.01 weight %.

4. The light emitter of claim 2, wherein the light diffusing particles comprise particles with a weight average diameter in which a product of the absolute value of the refractive index difference Δn and a weight average diameter d (mm) of the particles is greater than or equal to 0.0001 (mm).

5. The light emitter of claim 1, wherein the transparent substrate is a light guide with a haze value of less than or equal to 30% in the thickness direction.

6. The light emitter of claim 1, wherein the transparent substrate is composed so that a number of particle layer $S_1$ in the thickness direction is less than or equal to 0.15.

7. The light emitter of claim 1, wherein
a plate thickness of the transparent substrate, t (mm), is in a range of D/2≤t≤20D, and
a size in a thickness direction of a light source that supplies the light from an end surface of the transparent substrate is D (mm).

8. The light emitter of claim 1, wherein a shape of the light emitter is bar-shaped.

9. The light emitter of claim 1, wherein a shape of the light emitter is tubular-shaped.

10. The light emitter of claim 2, wherein concentration of the light diffusing particles is greater than or equal to 0.0001 weight % and less than or equal to 0.01 weight %.

11. The light emitter of claim 10, wherein the light diffusing particles comprise particles with a weight average diameter in which a product of the absolute value of the refractive index difference Δn and a weight average diameter d (mm) of the particles is greater than or equal to 0.0001 (mm).

12. The light emitter of claim 2, wherein the transparent substrate is a light guide with a haze value of less than or equal to 30% in the thickness direction.

13. The light emitter of claim 3, wherein the transparent substrate is a light guide with a haze value of less than or equal to 30% in the thickness direction.

14. The light emitter of claim 4, wherein the transparent substrate is a light guide with a haze value of less than or equal to 30% in the thickness direction.

15. The light emitter of claim 2, wherein the transparent substrate is composed so that a number of particle layer $S_1$ in the thickness direction is within 0.15.

16. The light emitter of claim 2, wherein a plate thickness of the transparent substrate t (mm) is in a range of $D/2 \leq t \leq 20D$ wherein a size in a thickness direction of a light source that supplies the light from an end surface of the transparent substrate is D (mm).

17. The light emitter of claim 2, wherein a shape of the light emitter is bar-shaped.

18. The light emitter of claim 2, wherein a shape of the light emitter is tubular-shaped.

19. A light emitter, comprising a transparent substrate comprising light diffusing particles, wherein the light emitter comprises at least light diffusing particles with an absolute value of a refractive index difference $\Delta n$ between a refractive index of the transparent substrate and a refractive index of the light diffusing particles that is greater than or equal to 0.3 and less than or equal to 3, and concentration of the light diffusing particles is greater than or equal to 0.0001 weight % and less than or equal to 0.01 weight %.

20. The light emitter of claim 19, wherein the light diffusing particles comprise particles with a weight average diameter in which a product of the absolute value of the refractive index difference $\Delta n$ and a weight average diameter d (mm) of the particles is greater than or equal to 0.0001 (mm).

* * * * *